(12) United States Patent
Guicquero et al.

(10) Patent No.: US 10,701,278 B2
(45) Date of Patent: Jun. 30, 2020

(54) METHOD OF INTER-FRAME AND INTRA-FRAME IMAGE PROCESSING

(71) Applicant: Commissariat à l'Energie Atomique et aux Energies Alternatives, Paris (FR)

(72) Inventors: William Guicquero, Grenbole (FR); Arnaud Verdant, Grenbole (FR)

(73) Assignee: Commissariat à l'Energie Atomique et aux Energies Alternatives, Paris (FR)

( * ) Notice: Subject to any disclaimer, the term of this patent is extended or adjusted under 35 U.S.C. 154(b) by 26 days.

(21) Appl. No.: 16/278,157

(22) Filed: Feb. 17, 2019

(65) Prior Publication Data
US 2019/0281203 A1    Sep. 12, 2019

(30) Foreign Application Priority Data

Mar. 8, 2018    (FR) .................................... 18 52021

(51) Int. Cl.
| | |
|---|---|
| *H04N 5/235* | (2006.01) |
| *G06K 9/00* | (2006.01) |
| *H04N 5/232* | (2006.01) |
| *H04N 19/137* | (2014.01) |

(Continued)

(52) U.S. Cl.
CPC ....... *H04N 5/2353* (2013.01); *G06K 9/00664* (2013.01); *H04N 5/2356* (2013.01); *H04N 5/23232* (2013.01); *H04N 5/23245* (2013.01); *H04N 19/107* (2014.11); *H04N 19/137* (2014.11); *H04N 19/172* (2014.11)

(58) Field of Classification Search
CPC . H04N 5/2353; H04N 5/23232; H04N 5/2356
See application file for complete search history.

(56) References Cited

U.S. PATENT DOCUMENTS

| 7,173,663 B2 | 2/2007 | Skow et al. |
| 8,059,174 B2 | 11/2011 | Mann et al. |

(Continued)

FOREIGN PATENT DOCUMENTS

| EP | 2323361 A1 | 5/2011 |
| EP | 2985997 A2 | 2/2016 |
| EP | 3091729 A1 | 11/2016 |

OTHER PUBLICATIONS

Preliminary Research Report in French Application No. 1852021 dated Oct. 31, 2018, 2 pages.

*Primary Examiner* — Christopher K Peterson
(74) *Attorney, Agent, or Firm* — Moreno IP Law LLC

(57) ABSTRACT

The invention concerns a method of performing intra-frame and inter-frame image processing comprising: alternating first and second image capture operations, the first image capture operation comprises capturing one or more first images (IA) based on a first set of image capture parameters (PA) and the second image capture operation comprises capturing one or more second images (IB) based on a second set of image capture parameters (PB), the values of the parameters of the first set being modified between each of the first image capture operations and the values of the parameters of the second set remaining constant between each of the second image capture operations or varying by less than a significant amount.

13 Claims, 2 Drawing Sheets

(51) Int. Cl.
*H04N 19/172* (2014.01)
*H04N 19/107* (2014.01)

(56) References Cited

U.S. PATENT DOCUMENTS

| | | | |
|---|---|---|---|
| 2008/0158389 A1* | 7/2008 | Jeong | H04N 5/77 |
| | | | 348/231.7 |
| 2011/0242334 A1 | 10/2011 | Wilburn et al. | |
| 2014/0176758 A1 | 6/2014 | Fujita | |
| 2014/0232929 A1* | 8/2014 | Ichikawa | G06T 7/246 |
| | | | 348/362 |
| 2015/0130981 A1 | 5/2015 | Hagiwara | |
| 2015/0324622 A1 | 11/2015 | Meier et al. | |

* cited by examiner

METHOD OF INTER-FRAME AND INTRA-FRAME IMAGE PROCESSING

CROSS-REFERENCE TO RELATED APPLICATION

Field

The present disclosure relates to the field of image processing, and in particular to a method and device for inter-frame and intra-frame image processing.

BACKGROUND

Intra-frame and inter-frame image processing algorithms can be used for a wide variety of applications.

Intra-frame image processing involves extracting information within a single frame, and can for example be used for applications such as object detection, for image histogram analysis and in methods of scene classification.

Inter-frame image processing involves extracting information from a sequence of two or more frames, and can for example be used for applications such as motion detection, object tracking, and in methods of temporal filtering.

In certain operating modes of an image processor, it may be desirable to employ both intra-frame and inter-frame image processing on captured images. However, there is a technical difficulty in applying both intra-frame and inter-frame image processing algorithms while remaining robust in the presence of changing scene conditions.

There is thus a need in the art for an improved method and device for performing both intra-frame and inter-frame image processing.

SUMMARY

It is an aim of embodiments of the present description to at least partially address one or more problems in the prior art.

According to one aspect, there is provided a method of performing intra-frame and inter-frame image processing comprising: alternating first and second image capture operations, wherein the first image capture operation comprises capturing one or more first images using an image sensor based on a first set of image capture parameters and the second image capture operation comprises capturing one or more second images using the image sensor based on a second set of image capture parameters, the values of the parameters of the first set being modified between each of said first image capture operations and the values of the parameters of the second set remaining constant between each of the second image capture operations or varying by less than a significant amount.

According to one embodiment, the method further comprises performing intra-frame image processing on each image captured during the first image capture operation; and performing inter-frame image processing on each image captured during the second image capture operation.

According to one embodiment, the values of the parameters of the second set vary by less than a significant amount that would cause the false positive detection of an event during the inter-frame image processing even in the absence of a change in the image scene.

According to one embodiment, both the intra-frame and inter-frame image processing are performed during a first mode of operation, and a transition to a second mode of operation occurs when a condition is met, the condition being based on the intra-frame image processing and/or based on the inter-frame image processing.

According to one embodiment, the condition is that motion is detected based on the inter-frame imaging processing.

According to one embodiment, the values of the parameters of the first set are modified based on one or more images captured during each first image capture operation.

According to one embodiment, the values of the parameters of the second set remain constant during a plurality of the second image capture operations and are periodically updated based on one or more of the first and/or second images.

According to one embodiment, the method further comprising: calculating, based on intra-frame image processing of one or more of the first images, modified values of one or more of the parameters of the first set in order to adjust the exposure time of the first images during the first image capture operations.

According to one embodiment, each of the first and second image capture operations consists in capturing only one image.

According to a further aspect, there is provided an image capture device for performing intra-frame and inter-frame image processing, the image capture device comprising: an image sensor configured to alternate between first and second image capture operations, the first image capture operation comprising capturing one or more first images based on a first set of image capture parameters and the second image capture operation comprises capturing one or more second images based on a second set of image capture parameters; and parameter update circuitry configured to modify the values of the parameters of the first set between each of the first image capture operations and to maintain the values of the parameters of the second set constant between each of the second image capture operations or to vary the values of the parameters of the second set by less than a significant amount.

According to one embodiment, the image capture device further comprises: an image processing circuit configured to perform intra-frame image processing on the images captured by the first image capture operations and to perform inter-frame image processing on the images captured by the second image capture operations.

According to one embodiment, the image processing circuit is configured: to perform the intra-frame and inter-frame image processing while in a first mode; to evaluate a condition based on the intra-frame and/or inter-frame image processing; and to transition to a second mode when the condition is met.

According to one embodiment, the parameter update circuitry is configured to vary the values of the parameters of the second set by less than a significant amount that would cause the false positive detection of an event by the image processing circuit, during the inter-frame image processing even in the absence of a change in the image scene.

According to one embodiment, the image processing circuit is integrated in a same integrated circuit as the image sensor.

According to one embodiment, the image processing circuit is further configured to calculate, based on intra-frame image processing of one or more of the first images, modified values of one or more of the parameters of the first set in order to adjust the exposure time of the first images.

BRIEF DESCRIPTION OF THE DRAWINGS

The foregoing and other features and advantages will become apparent from the following detailed description of embodiments, given by way of illustration and not limitation with reference to the accompanying drawings, in which.

DETAILED DESCRIPTION OF THE PRESENT EMBODIMENTS

The term "intra-frame image" is used herein to designate a captured frame of a video sequence to which intra-frame image processing is applied.

The term "intra-frame image processing" or "intra-frame processing" is used herein to designate the processing of a frame of a video sequence to extract information only from within the given frame. Examples of applications of intra-frame image processing include:

image histogram analysis, local tone wrapping and/or white balance;

scene classification and/or object detection; and shape recognition, including edge, contour, gradient, blob and/or keypoint extraction, object counting and/or image segmentation.

The term "inter-frame image" is used herein to designate a captured frame of a video sequence to which inter-frame image processing is applied.

The term "inter-frame image processing" or "inter-frame processing" is used herein to designate image processing of video in order to extract information from a plurality of frames, generally in sequence. Examples of applications of inter-frame image processing include:

motion detection, for example for wakeup sensors, involving for example the extraction of a first image plane with respect to the background, the background extraction for example being based on a Gaussian Mixture Model;

object tracking; and temporal filtering and/or pulsation analysis, in order for example to detect a wakeup signal in the form of light communication at a specific frequency and/or having a certain signature.

The term "image capture parameter" is used to designate any of a broad range of parameters than may be set when an image is to be captured by an image sensor. These for example include:

parameters setting the exposure time, including the integration time of a photodiode, or other type of photosite, of each pixel and/or the opening time of a shutter, in order to reduce the effects of data quantization and noise by setting the dynamic range based on the scene;

parameters setting the focal plane, for example by adjusting the lens power and/or depth of field, in order to obtain a sharp image;

parameters setting the gain, including the conversion gain of each pixel and the gain in the read out circuitry at the bottom of the columns of the pixel array;

parameters setting a zoom or ROI (region of interest), such as optical settings permitting to zoom to a particular zone of interest, and the extraction of a particular zone of interest by a selection of certain pixels within the pixel array during digital processing; and parameters setting the sensitivity of the image sensor to a specific spectral band for example to a band within the visible light and near infrared spectrum.

Figure 1:
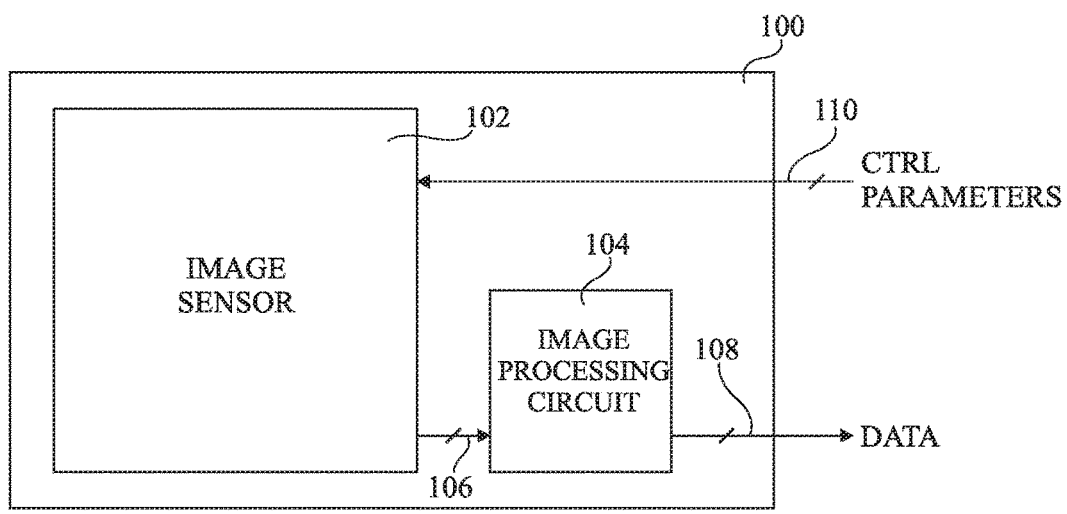
FIG. 1 schematically illustrates an image capture device according to an example embodiment.

FIG. 1 schematically illustrates an example of an image capture device 100 comprising an image sensor (IMAGE SENSOR) 102, and an image processing circuit (IMAGE PROCESSING CIRCUIT) 104. The image processing circuit 104 receives image data on output lines 106 of the image sensor 102, and provides output data (DATA) on output lines 108 of the image capture device. The output data on the lines 108 for example comprises information detected based on the captured images. The image processing circuit 104 is integrated in a same integrated circuit as the image sensor 102. This provides the advantage that certain image processing can be performed on-chip based on the image data captured by the image sensor 102, and the number of output pins of the image capture device 100 can thus be reduced.

The image sensor 102 captures images based on image capture parameters (CTRL PARAMETERS) provided on input lines 110 of the image capture device 100.

The present inventors have found that, in the case that it is desired to perform both intra-frame and inter-frame image processing on the images captured by the image sensor 102 using the image processing circuit 104, there is a technical difficulty in providing appropriate image capture parameters suited to both types of imaging processing.

Indeed, in the case of intra-frame image processing, the image quality of each captured image should be high. In particular, constraints during intra-frame image processing can be relaxed by providing images with suitably adapted focus and exposure time, such that the images are sharp, and properly exposed providing an acceptable dynamic range. Indeed, processing such as contour or edge detection is considerably harder if edges in the image are blurred, or if there is insufficient contrast. Obtaining appropriate focusing and exposure for example implies continuously adapting the image capture parameters in order to adjust the exposure time, focus, dynamic range, contrast, granularity, etc., based on the scene.

On the contrary, in the case of inter-frame image processing, it is desirable to detect changing features in the scene from one image to the next. Therefore, the image capture parameters for setting the exposure time, focus, dynamic range, contrast, granularity, etc., should remain relatively constant from one image to the next in order to allow accurate detection of changes in the scene. Indeed, in the particular context of motion detection, which is generally based on the detection of changes of image features, an abrupt modification of the image capture parameters can lead to a false positive detection. In that case, what is detected by the motion detection algorithm is thus an artifact due to the modification of image capture parameters from one frame to another.

While one solution could be to attempt to find a compromise between the image capture parameters adapted to inter-frame and intra-frame image processing by limiting the variations in the image capture parameters between successive images, this would still imply added complexity to the image processing, algorithms implemented by the image processing circuit 104. Indeed, greater complexity would be required to provide both robust intra-frame and inter-frame image processing of images captured using suboptimal image capture parameters. Such added complexity is undesirable, particularly in the case of an on-chip image processing circuit such as the circuit 104 of FIG. 1, its it implies higher chip area, power consumption and/or processing time.

Figure 2:
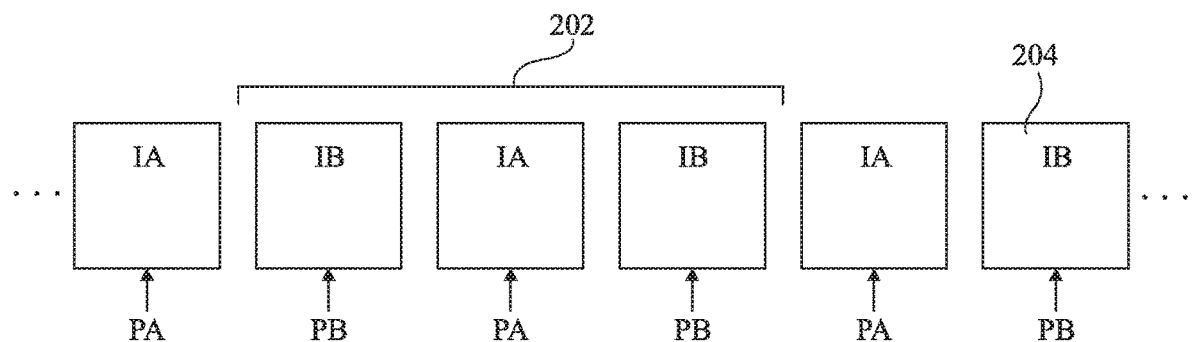
FIG. 2 represents a sequence of captured frames according to an example embodiment of the present disclosure.

FIG. 2 represents a method of image capture according to an embodiment of the present disclosure. An image sensor is for example controlled in order to alternate between capturing images IA suitable for intra-frame image processing and images 113 suitable for inter-frame image processing. In other words, intra-frame and inter-frame image capture is for example interleaved. The images IA are captured based on a set of image capture parameters PA, the values of which for example adapt rapidly to changing conditions in the image scene. The parameters PA are for example updated between the capture of each image IA. The images IB are captured based on a set of image capture parameters PB, the values of which remain relatively constant.

In some embodiments, the image capture parameters PB remain constant for certain periods, such as for a period 202 represented in FIG. 2 spanning the capture of at least two images IB. After this period, the image capture parameters PB are for example updated to reflect the new image scene conditions ready for the capture of a subsequent image IB 204. The parameters PB are then for example held constant for a further period.

Alternatively, the image capture parameters PB may be permitted to vary by less than a significant amount between the capture of successive images IB. A significant amount for example corresponds to a variation that would trigger the false positive detection of an event during the inter-frame image processing operation in the absence of a change in the image scene. In some embodiments, a periodic recalibration of the image capture parameters PB is also performed in order to reflect larger changes in the image scene conditions, as described above.

While in the example of FIG. 2 the image sensor alternates between capturing IA and IB images for each captured image, more generally the image sensor could alternate between intra-frame and inter-frame image capture operations, each intra-frame image capture operation corresponding to the capture of one or more images suitable for intra-frame image processing, and each inter-frame image capture operation corresponding to the capture of one or more images suitable for inter-frame image processing. However, in some embodiments, each intra-frame and inter-frame image capture operation is limited to the capture of 20 images or frames, and preferably to the capture of 10 images or frames.

Figure 3:
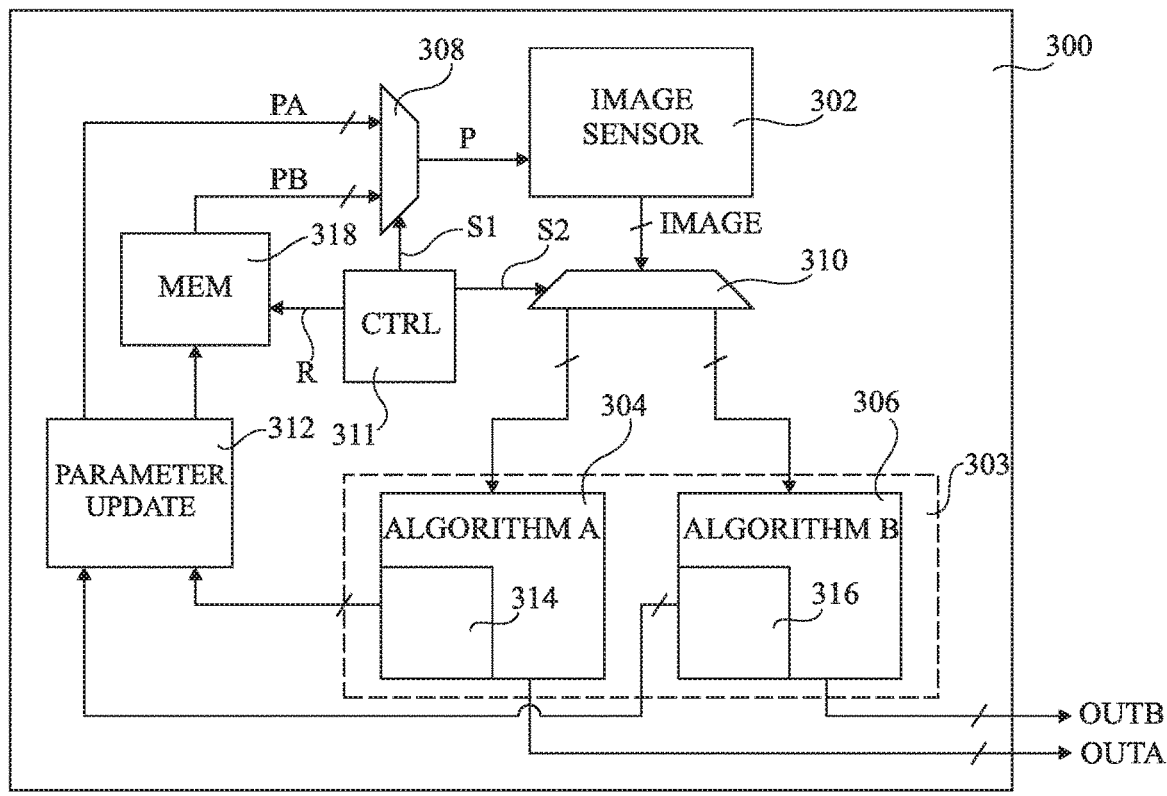
FIG. 3 schematically illustrates an image capture device according to an example embodiment of the present disclosure.

FIG. 3 schematically illustrates an image capture device 300 according to an example embodiment of the present disclosure. The device 300 comprises an image sensor (IMAGE SENSOR) 302, which is for example a CMOS sensor, and an image processing circuit 303 comprising a portion 304 configured to perform intra-frame image processing, and a portion 306 configured to perform inter-frame image processing. The portion 304 for example provides intra-frame processing output data OUTA on output lines of the device 300, and the portion 306 for example provides inter-frame processing output data OUTB on output lines of the device 300. The image processing circuit 303 is for example implemented by dedicated hardware.

The image processing circuit 303 is for example integrated in a same integrated circuit as the image sensor 302, although in alternative embodiments they could be implemented by separate chips. More generally, image capture device 300 is for example a full custom CMOS System on Chip, including all previously described elements of the device 300, where the image sensor 302 represents the array of pixels on the focal plane.

The image capture device 300 for example further comprises demultiplexers 308 and 310 respectively controlled by control signals S1 and S2 generated by a control circuit (CTRL) 311. The demultiplexer 308 provides image capture parameters P to the image sensor 302 in order to control the image capture operations, these parameters being selected from a set PA suitable for capturing images for intra-frame image processing, and a set PB suitable for capturing images for inter-frame image processing. The demultiplexer 310 distributes the images (IMAGE) captured by the image sensor 302 to the portions 304 and 306 of the image processing circuit 303.

The set PA of image capture parameters is for example provided by a parameter update circuit (PARAMETER UPDATE) 312, based for example on the result of intra-frame image processing performed by an algorithm (ALGORITHM A) 314 of the portion 304 of the image processing circuit 303, and/or on the result of inter-frame image processing performed by an algorithm (ALGORITHM B) 316 of the portion 306 of the image processing circuit 303.

The set PB of image capture parameters is for example provided by the parameter update circuit 312 via a memory (MEM) 318, which for example controls the rate at which the parameters PB are updated. The memory 318 is for example under control of the control circuit 311, which for example provides a refresh signal R indicating when the parameters PB are to be refreshed.

Operation of the image capture device 300 will now be described in more detail with reference to FIG. 4.

Figure 4:
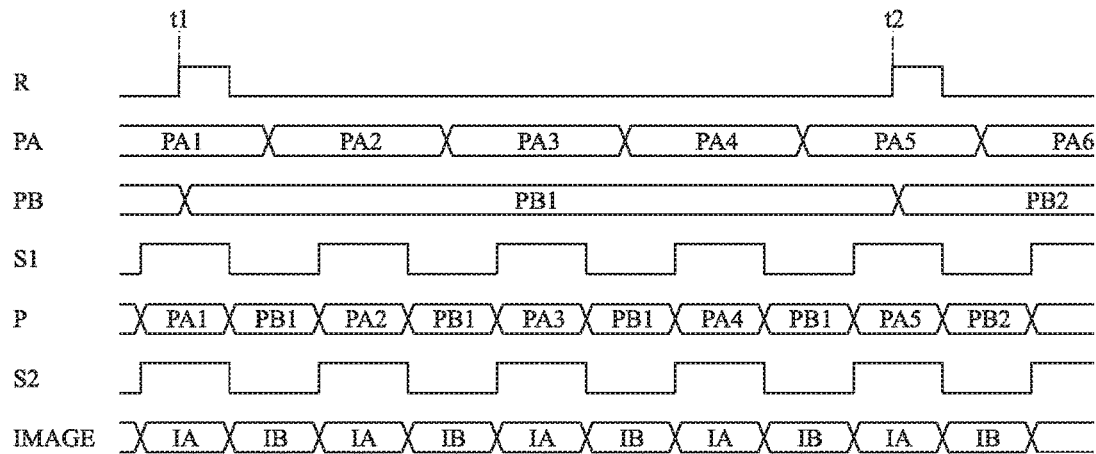
FIG. 4 is a timing diagram representing examples of signals in the image capture device of FIG. 3.

FIG. 4 is a timing diagram showing examples of the signals R, PA, PB, S1, P, S2 and IMAGE in the circuit 300 of FIG. 3.

The signal S1 for example alternates between high and low levels, and in the example of FIG. 4, the high level causes the set of parameters PA to be provided to the image sensor 302, and the low level causes the set of parameters PB to be provided to the image sensor 302.

The set of parameters PA is for example refreshed before the capture of each intra-frame image IA, for example during the low period of the signal S1 so that the set of parameters PA remains constant while the signal S1 is high. In the example of FIG. 4, the set of parameters PA transitions from a set of values PA1 to sets of values PA2, PA3, PA4, PA5, PA6, etc.

The set of parameters PB is for example refreshed by the refresh signal R at a time t1 to assume a set of values PB1, and then again at a time t2 to assume a set of values PB2. The times t1 and t2 are for example chosen to fall during high periods of the signal S1 so that the set of parameters PB remains constant during the low periods of the signal S1. In the example of FIG. 4, the set of parameters PB remains at the set of values PB for four inter-frame images, before transitioning to the set of values PB2 following the high pulse of the refresh R at the time t2. Of course, in alternative embodiments, depending on the inter-frame image processing to be applied, the set of parameters PB could remain constant for fewer images or a greater number of images.

The signal S2 for example alternates between high and low levels. Each high level of the signal S2 is for example synchronized with the application of the set of parameters PA and causes the output image from the image sensor 302 to be treated as an intra-frame processing image, which is directed to the portion 304 of the image processing circuit 303 for intra-frame image processing. Each low level of the signal S2 is for example synchronized with the application of the set of parameters PB and causes the output image from the image sensor 302 to be treated as an inter-frame processing image, which is directed to the portion 306 of the image processing circuit 303 for inter-frame image processing.

The image processing circuit 303 may operate in any of several different operating modes, and in at least some of these operating modes both intra-frame and inter-frame image processing is for example performed. For example, both the intra-frame and inter-frame image processing is performed during one mode of operation of the circuit 303, and a transition to another mode of operation occurs when a condition is met, the condition being based on the intra-frame image processing and/or on the inter-frame image processing.

One particular example of the operating modes of the image processing circuit 303 will now be described in more detail with reference to FIG. 5.

Figure 5:
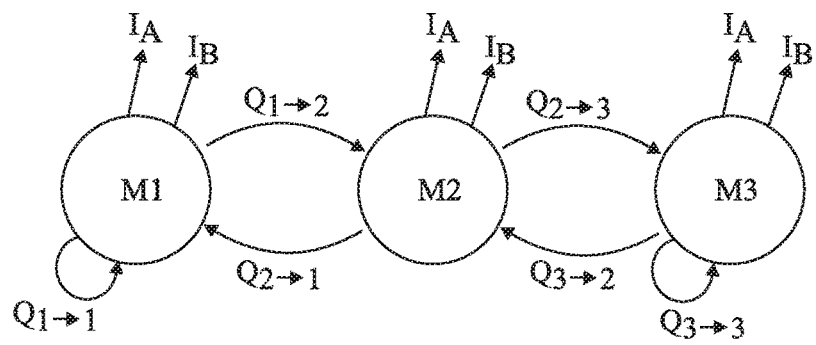
FIG. 5 is a state diagram showing states of an image processing device of FIG. 3 according to an example embodiment.

FIG. 5 is a state diagram representing an example of the operation of the image processing circuit 303 according to an example embodiment in which object and motion detection is performed.

According to the example of FIG. 5, the image capture device 300 is an always-on smart CMOS image sensor having multiple awakening levels, modes or states denoted as M1, M2 and M3 in FIG. 5. For example, the device 300 is in a fixed position, and is woken by a detected movement within its field of view.

The image processing circuit 303 for example starts in a first state or mode M1, corresponding to a deep sleep mode. In this mode, intra-frame images IA and inter-frame images IB are alternately captured by the image sensor 302, and the image processing circuit 303 performs both intra-frame and inter-frame image processing.

During the mode M1, the intra-frame images IA are for example employed to track the average luminosity and then to perform, by retroaction, auto-exposure adjustment for the capture of subsequent intra-frame images IA. The inter-frame images IB are for example employed to detect motion with a fixed exposure time.

For example, the average luminosity in the intra-frame images IA is calculated by the algorithm 314 in the portion 304 of the image processing circuit 303, and is used by the parameter update circuit 312 to update the set of parameters PA between the capture of each intra-frame image. The exposure time of the intra-frame images can thus be controlled automatically based on the calculated average luminosity.

The inter-frame images IB are for example employed to detect frame differences due to scene changes, e.g. the movement of objects between images. In some embodiments, the exposure time of the inter-frame images is also periodically refreshed based on the detected luminosity calculation based on the intra-frame images IA.

In the mode M1, motion is detected when a condition $Q_{1\rightarrow 2}$ is met, which corresponds for example to the amount of change between successive inter-frame images exceeding a certain threshold. When this condition is met, the circuit 303 for example transitions to the mode M2. Alternatively, if the condition Q1→2 is not met, the circuit 303 remains in the mode M1 ($Q_{1\rightarrow 1}$).

In the mode M2, the inter-frame images IB are for example employed to confirm the motion detection, for example by detecting further motion, and to identify a region of interest (ROI) based on the location of the detected movement in the images. Furthermore, the auto-exposure based on the intra-frame images IA as described above for the mode M1 is for example also applied in the mode M2, but only to the identified region of interest.

The motion is confirmed when a condition $Q_{2\rightarrow 3}$ is met, and the circuit 303 then transitions the mode M3. Alternatively, if not enough motion is detected, the circuit 303 transitions back to the mode M1 ($Q_{2\rightarrow 1}$).

In the mode M3, the intra-frame images IA are for example employed for the detection of objects of interest within the region of interest. Furthermore, the inter-frame images IB continue to be employed for motion detection. The circuit 303 for example remains in the mode M3 if an object of interest is detected in the region of interest or if motion continues to be detected ($Q_{3\rightarrow 3}$). Alternatively, if there is not enough motion detected based on the inter-frame images IB and no object of interest is detected, the circuit 303 for example returns to the mode M2 ($Q_{3\rightarrow 2}$).

An advantage of the embodiments described herein is that inter-frame and intra-frame image processing performed by an image processing circuit can be made more robust by alternating between the capture of intra-frame and inter-frame images, and adjusting image capture parameters for the intra-frame and inter-frame images independently from each other.

Having thus described at least one illustrative embodiment, various alterations, modifications and improvements will readily occur to those skilled in the art. For example, it will be apparent that the principles described herein could be applied to the capture of any types of images from an image scene. For example, the image sensor may be sensitive to visible light or infrared light, or any combination of wavelengths, and may comprise any type, or combination of types, of photosites.

Furthermore, while FIG. 3 provides one example of the circuit for updating the image capture parameters, it will be apparent to those skilled in the art that there are many variations that could be applied. For example, the multiplexer 310 could be omitted in some embodiments.

Furthermore, the various features described in relation with the various embodiments could be combined, in alternative embodiments, in any combination.

What is claimed is:

1. A method of performing intra-frame and inter-frame image processing comprising:
    alternating first and second image capture operations, wherein the first image capture operation comprises capturing one or more first images using an image sensor based on a first set of image capture parameters and the second image capture operation comprises capturing one or more second images using the image sensor based on a second set of image capture parameters, the values of the parameters of the first set being modified between each of said first image capture operations based on changing scene conditions detected by image processing of one or more of the first and/or second images, and the values of the parameters of the second set remaining constant between each of the second image capture operations or varying by less than a significant amount;
    performing intra-frame image processing on each first image captured during the first image capture operation; and
    performing inter-frame image processing on each second image captured during the second image capture operation.

2. The method of claim 1, wherein the values of the parameters of the second set vary by less than a significant amount that would cause the false positive detection of an event during the inter-frame image processing even in the absence of a change in the image scene.

3. The method of claim 1, wherein both the intra-frame and inter-frame image processing are performed during a first mode of operation, and wherein a transition to a second mode of operation occurs when a condition is met, the condition being based on said intra-frame image processing and/or based on said inter-frame image processing.

4. The method of claim 3, wherein said condition is that motion is detected based on said inter-frame imaging processing.

5. The method of claim 1, wherein the values of the parameters of the first set are modified by performing image processing on one or more of the first images captured during at least one of the first image capture operations.

6. The method of claim 1, wherein the values of the parameters of the second set remain constant during a plurality of the second image capture operations and are periodically updated based on one or more of said first and/or second images.

7. The method of claim 1, further comprising:
calculating, based on intra-frame image processing of one or more of said first images, modified values of one or more of the parameters of the first set in order to adjust the exposure time of the first images during the first image capture operations.

8. The method of claim 1, wherein each of the first and second image capture operations consists in capturing only one image.

9. An image capture device for performing intra-frame and inter-frame image processing, the image capture device comprising:
an image sensor configured to alternate between first and second image capture operations, wherein the first image capture operation comprises capturing one or more first images based on a first set of image capture parameters and the second image capture operation comprises capturing one or more second images based on a second set of image capture parameters;
an image processing circuit configured to perform intra-frame image processing on the images captured by the first image capture operations and to perform inter-frame image processing on the images captured by the second image capture operations; and
parameter update circuitry configured to modify the values of the parameters of the first set between each of said first image capture operations based on changing scene conditions detected by the image processing of one or more of the first and/or second images and to maintain the values of the parameters of the second set constant between each of the second image capture operations or to vary the values of the parameters of the second set by less than a significant amount.

10. The image capture device of claim 9, wherein the image processing circuit is configured:
to perform said intra-frame and inter-frame image processing while in a first mode;
to evaluate a condition based on said intra-frame and/or inter-frame image processing; and
to transition to a second mode when the condition is met.

11. The image capture device of claim 9, wherein the parameter update circuitry is configured to vary the values of the parameters of the second set by less than a significant amount that would cause the false positive detection of an event by the image processing circuit during the inter-frame image processing even in the absence of a change in the image scene.

12. The image capture device of claim 9, wherein the image processing circuit is integrated in a same integrated circuit as the image sensor.

13. The image capture device of claim 9, wherein the image processing circuit is further configured to calculate, based on intra-frame image processing of one or more of said first images, modified values of one or more of the parameters of the first set in order to adjust the exposure time of the first images.

* * * * *